April 8, 1924.
T. B. DRESCHER
BIFOCAL LENS
Filed March 30, 1922
1,489,630
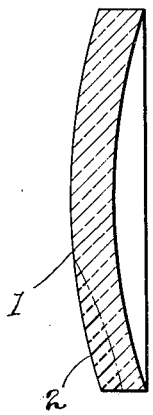
INVENTOR.
Theodore B. Drescher.
BY
his ATTORNEY.

Patented Apr. 8, 1924.

1,489,630

UNITED STATES PATENT OFFICE.

THEODORE B. DRESCHER, OF ROCHESTER, NEW YORK, ASSIGNOR TO BAUSCH & LOMB OPTICAL COMPANY, OF ROCHESTER, NEW YORK, A CORPORATION OF NEW YORK.

BIFOCAL LENS.

Application filed March 30, 1922. Serial No. 547,957. REISSUED

*To all whom it may concern:*

Be it known that I, THEODORE B. DRESCHER, of Rochester, in the county of Monroe and State of New York, have invented certain new and useful Improvements in Bifocal Lenses; and I do hereby declare the following to be a full, clear, and exact description of the same, reference being had to the accompanying drawings, forming a part of this specification, and to the reference numerals marked thereon.

My invention relates to bifocal lenses, has for its object to provide a lens made of two pieces of glass, but one which will provide for far and distant vision without objectionable color fringes at or near their juncture, and to this end consists in such a lens made of two pieces of glass each having a different index of refraction but both of which have the same dispersion.

In carrying out my invention, I prefer to employ the well known method of making such lenses with smooth uniform surfaces in which the blank for the major portion adapted for distant vision is provided with a ground and polished recess or countersink in which a minor lens having its convex surface ground and polished to a predetermined contour is secured, preferably by fusing, and the outer surfaces of the lens are then ground and polished for suitable curves so that the combined effect of the glass and curvature of this minor lens and the glass and curvature of the major portion with which it is in contact produce the reading or near vision portion of the lens of greater magnifying power.

Heretofore in lenses of this class the major and minor portions have been made of crown and flint glass respectively which not only have different refractive indices but different powers of dispersion, and the lenses thus produced are objectionable in that with this combination a color or chromatic effect at the margin of the reading portion is so pronounced that many persons are unable to wear them with comfort. On the other hand, if the attempt were made to make both lenses of glass of the same refractive index the minor or near vision lens necessarily of higher power, would extend outwardly beyond the surface of the other field and would be difficult to manufacture.

I have found however that the difficulties above mentioned can be overcome and a very satisfactory bifocal lens can be produced more economically by making the major portion or member of ordinary optical crown glass having a refractive index of, for instance, 1.52 and a dispersion of say $59\frac{1}{2}$ while the minor lens or inserted piece is also of optical crown glass having a higher index than the former say 1.616, but the same dispersion as the major portion. The fusing operations are the same as in the formation of other lenses of this general type, but as the fusing temperatures of both pieces of glass are nearly the same a little more care is necessary in preventing too high a fusing temperature so that the ground and polished surfaces will not be deformed.

In the accompanying drawing is shown a sectional view of a bifocal lens constructed in accordance with my invention, 1 representing the major portion and 2 the minor portion or segment.

I claim as my invention:

1. A bifocal lens comprising a major portion for distant vision having a countersink in the lower portion of one of its surfaces and a smaller lens segment secured in said countersink, both the major portion and segment being formed of glass having the same dispersion but different indices of refraction.

2. A bifocal lens comprising a major portion for distant vision having a countersink in the lower portion of one of its surfaces and a smaller lens segment secured in said countersink, both the major portion and segment being formed of glass having the same dispersion but that of the segment having a higher index of refraction.

3. A bifocal lens comprising a major portion for distant vision composed of crown glass and having a countersink in the lower portion of one of its surfaces and a smaller lens segment also composed of crown glass secured in said countersink, the glass of both the major portion and segment having the same dispersion but that of the segment having a higher index of refraction.

THEODORE B. DRESCHER.